Dec. 4, 1956  D. N. JUDELSON  2,772,734
BIAS CUTTING MACHINE
Filed July 28, 1954  5 Sheets-Sheet 2
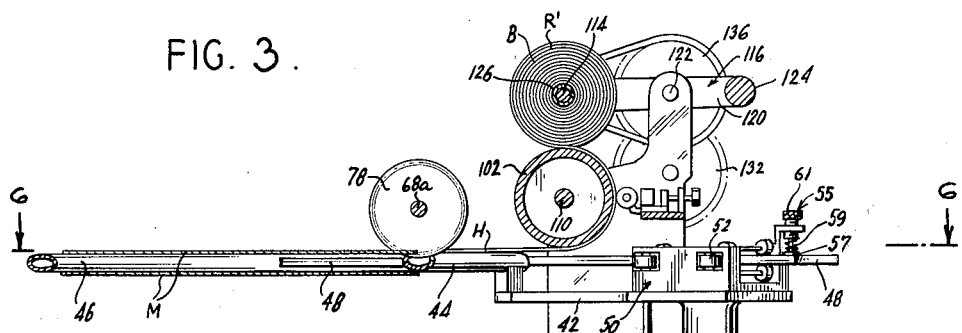
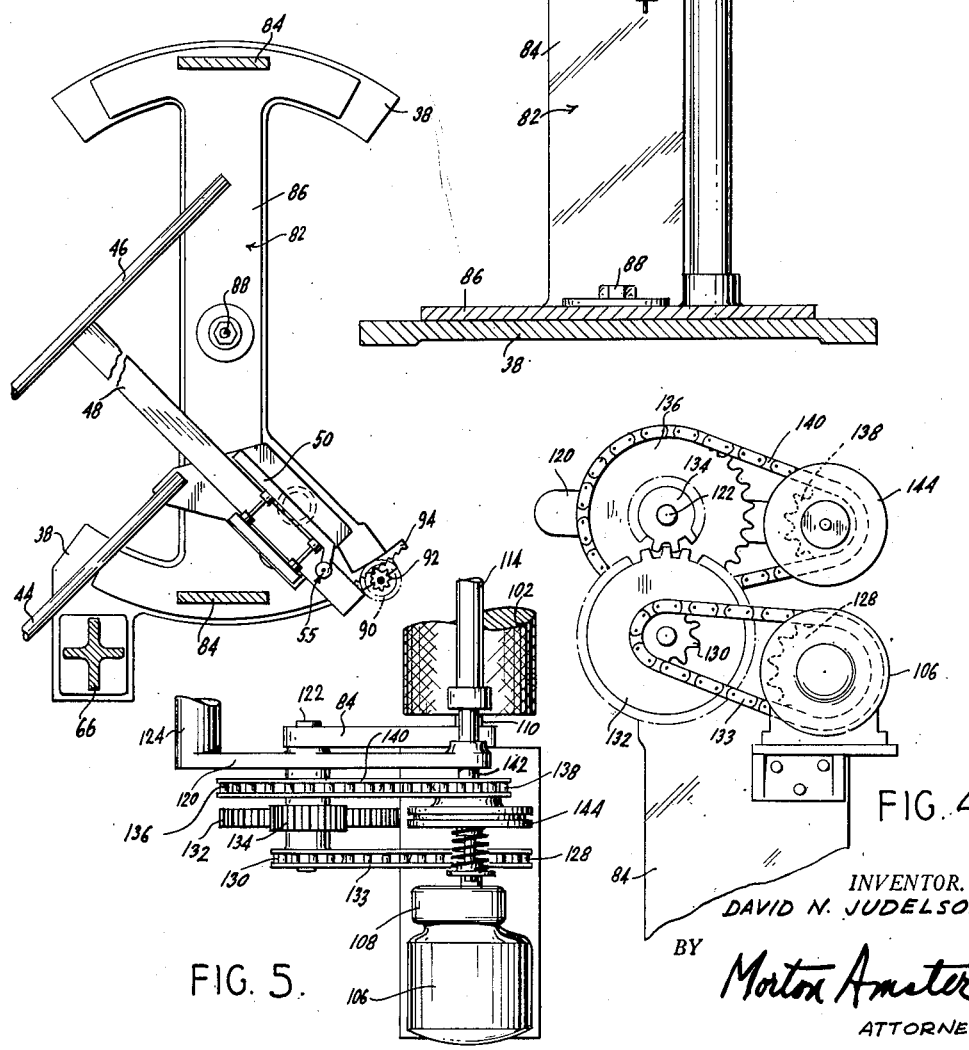
INVENTOR.
DAVID N. JUDELSON
BY Morton Amster
ATTORNEY Dec. 4, 1956   D. N. JUDELSON   2,772,734
BIAS CUTTING MACHINE
Filed July 28, 1954   5 Sheets-Sheet 3
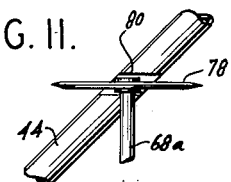
FIG. 11.
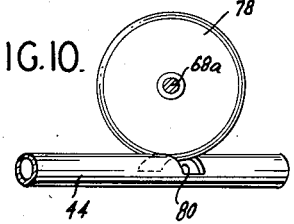
FIG. 10.
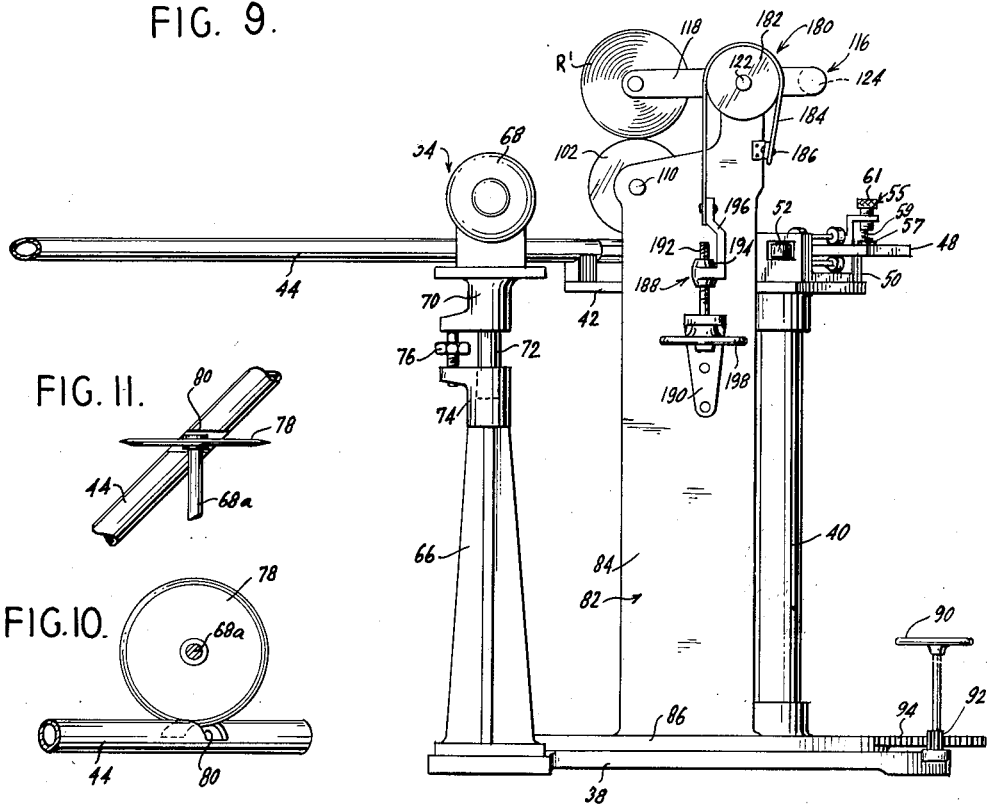
FIG. 9.
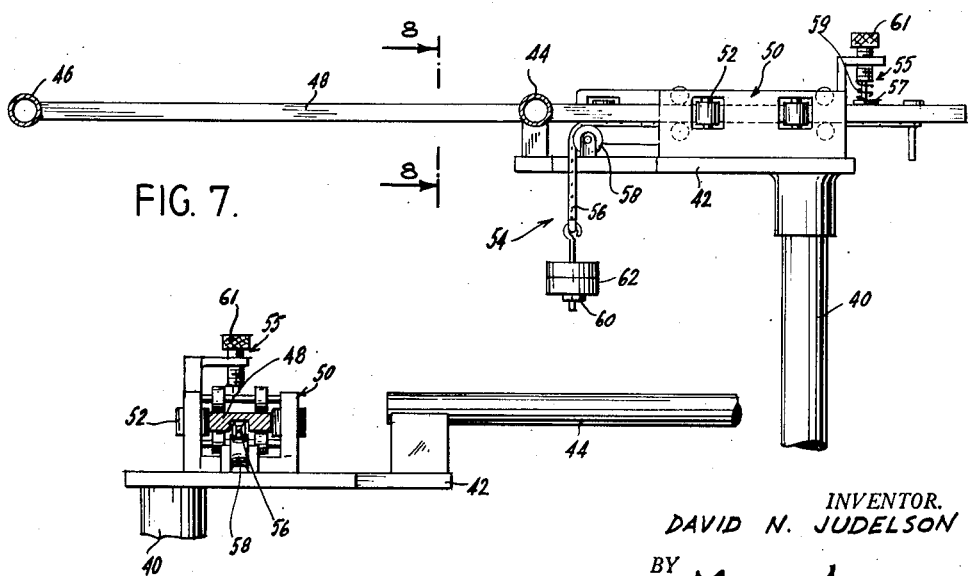
FIG. 7.
FIG. 8.
INVENTOR.
DAVID N. JUDELSON
BY Morton Amster
ATTORNEY Dec. 4, 1956 D. N. JUDELSON 2,772,734
BIAS CUTTING MACHINE
Filed July 28, 1954 5 Sheets-Sheet 4
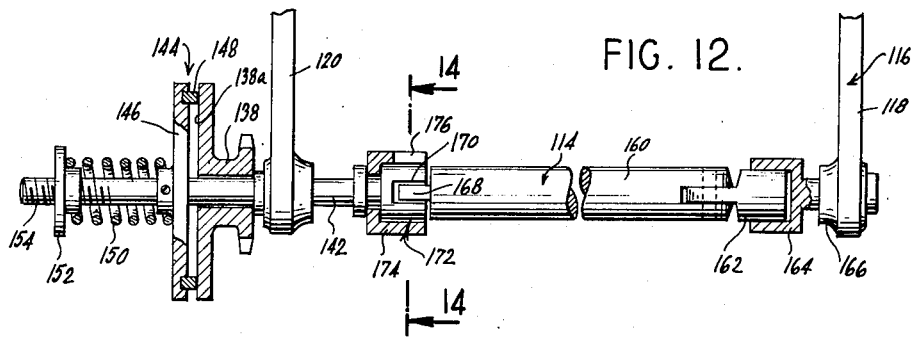
FIG. 12.
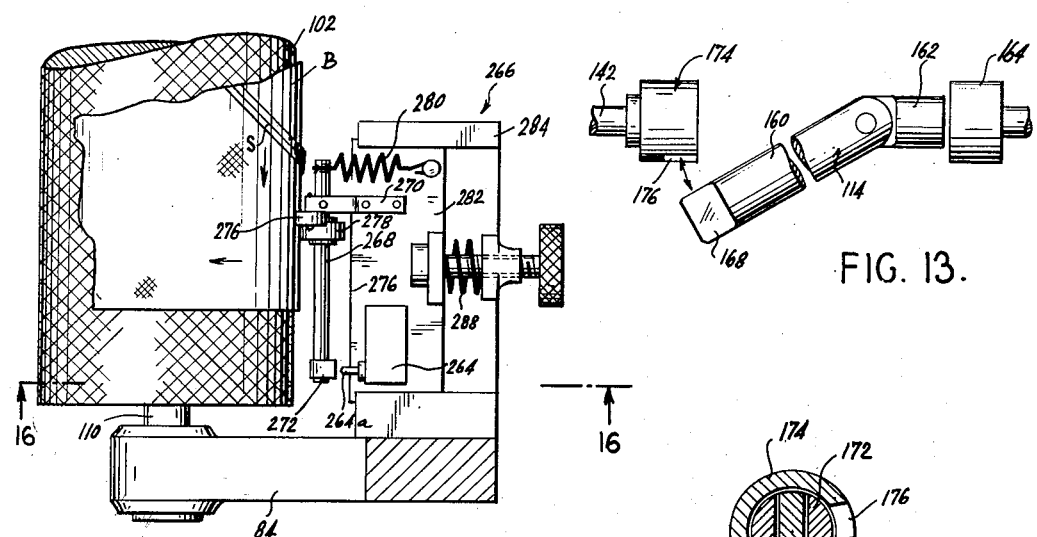
FIG. 13.
FIG. 15.
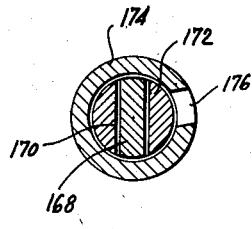
FIG. 14.
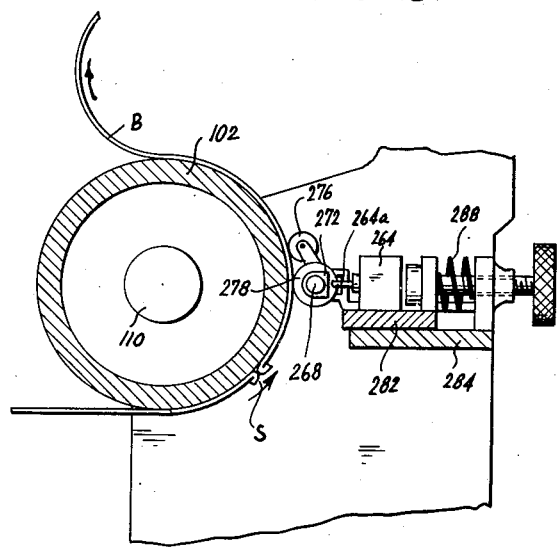
FIG. 16.
INVENTOR.
DAVID N. JUDELSON
BY Morton Amster
ATTORNEY.

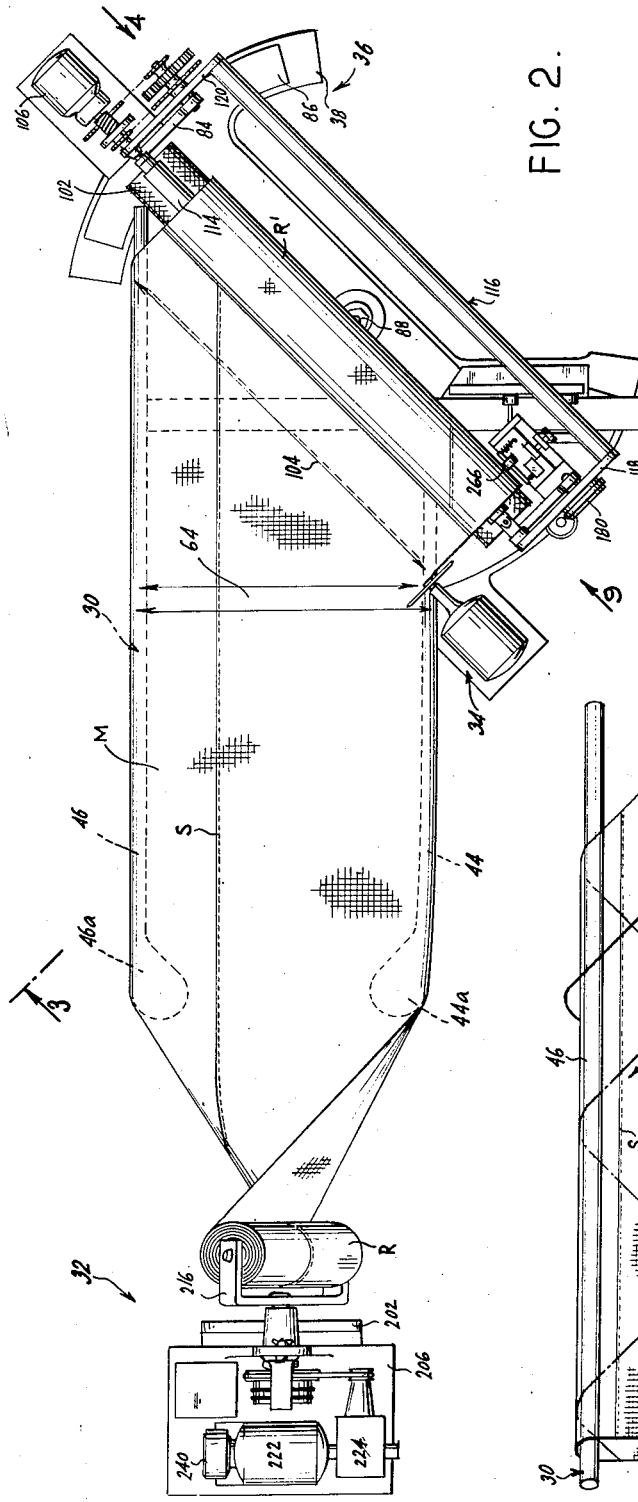

Dec. 4, 1956      D. N. JUDELSON      2,772,734
BIAS CUTTING MACHINE
Filed July 28, 1954      5 Sheets-Sheet 5
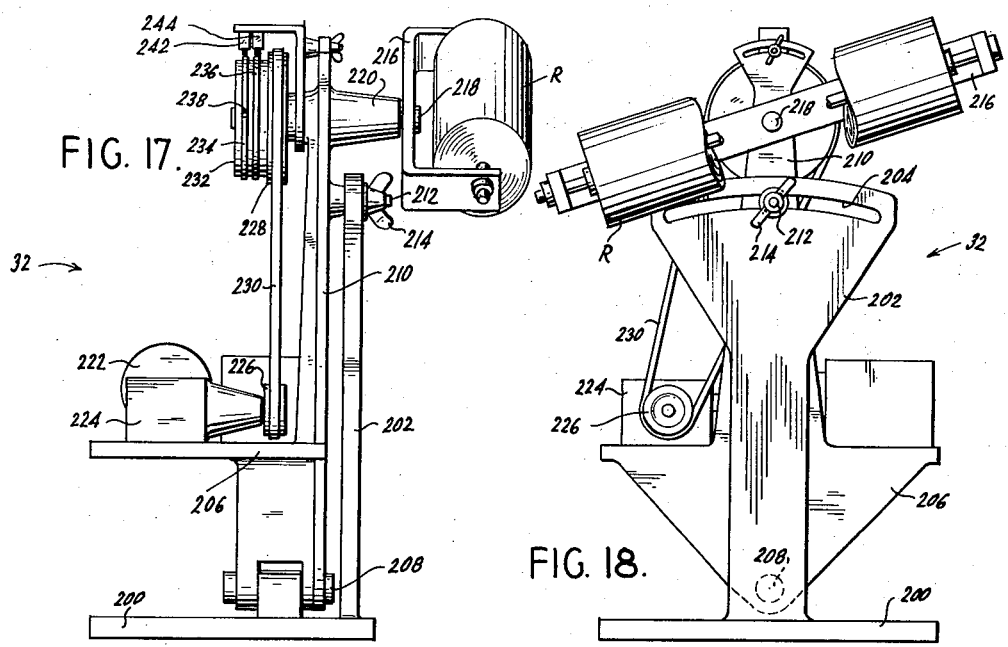
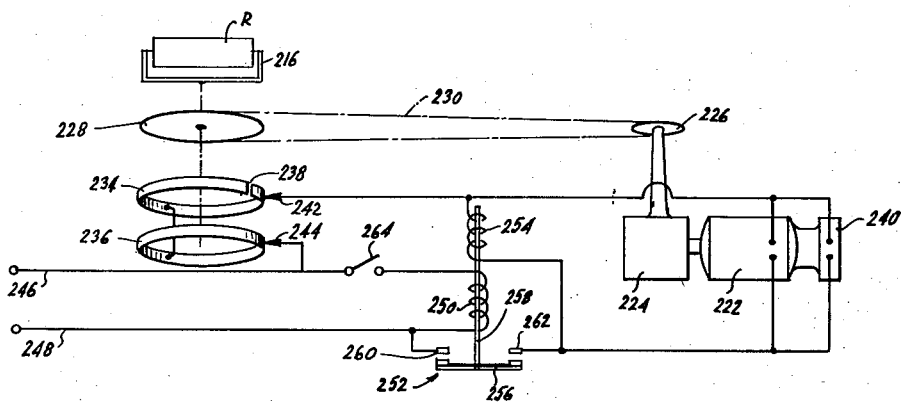
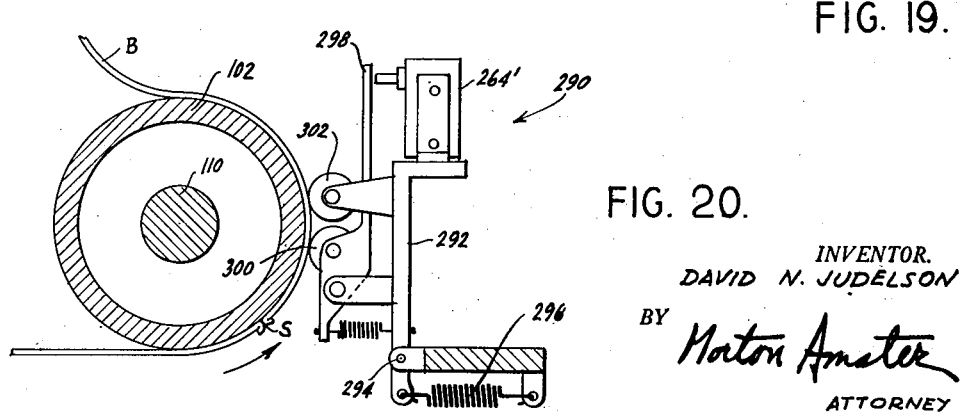
INVENTOR.
DAVID N. JUDELSON
BY
Morton Amster
ATTORNEY

United States Patent Office 2,772,734
Patented Dec. 4, 1956

2,772,734

BIAS CUTTING MACHINE

David N. Judelson, New York, N. Y., assignor to Oscar I. Judelsohn, Inc., New York, N. Y., a corporation of New York Application July 28, 1954, Serial No. 446,374

36 Claims. (Cl. 164—61)

The present invention relates to a machine for cutting material into strips, and in particular to apparatus for cutting a seamed tube of material into a continuous length of biased goods.

Numerous machines are known for bias cutting material to obtain continuous lengths of bias cut goods. Broadly such machines include a mandrel over which material seamed into tubular form is drawn in a spiral direction toward a knife. The tube of material is moved into cutting relation with the knife by appropriate pulling mechanisms, usually serving as the wind-up device for the continuous length of bias cut material.

Broadly, it is an object of the present invention to provide an improved bias cutting machine of the aforesaid general construction. More particularly, the invention is concerned with the improvement of such known bias cutting machines in respect to performance, and the yield of bias cut material having certain desirable properties.

One of the more troublesome problems encountered in bias cutting machines incorporating a wind-up device serving as the pulling mechanism for advancing the tubular material over the mandrel, has been that of uneven winding of the bias cut material onto the take-up shaft of the winding mechanisms. Uneven wind-up frequently necessitates rewinding of the biased material to obtain a roll having straight and aligned edges and/or the necessity of excessive trimming of the rewound roll in order to produce uniform edges. Uneven wind-up likewise may result in uneven pulling forces exerted on the tubular material being advanced over the mandrel toward the cutting zone which in turn may cause the cutting mechanism to produce an uneven or wavy cut edge, likewise to great disadvantage.

Therefore, it is an object of the present invention to provide a bias cutting machine assuring even wind-up of the bias cut material.

It is a further object of the present invention to provide a bias cutting machine in which the cutting action is vastly improved such that the opposite side edges of the biased material are straight and true. Advantageously, wind-up of the material may be achieved with extreme uniformity in respect to the cut edges of the bias cut material, eliminating the need for rewinding or excessive trimming.

In accordance with this aspect of the invention, even winding and excellent cutting action are obtained by a design in which substantially uniform and equal pulls are exerted on the bias cut material from side to side to advance the material over the mandrel. Uniform tension across the cutting zone assures the provision of substantially true and straight edges on the bias cut material.

A still further problem encountered with machines for bias cutting material from tubular form has been that of achieving substantially automatic operation. To this end, variable speed drives in conjunction with rotatable feeders have been employed for presenting the tubular material to the mandrel in correct rotational alignment, as determined by the rate of take-up of the wind-up mechanisms. Such variable speed drives, apart from their inherent complexity, require very precise and critical adjustment to obtain delivery of the seamed tube of material which is substantially synchronous with take-off of the bias cut material. That is, the pull exerted by the wind-up mechanism produces a spiral movement of the tubular material about the mandrel, which manifests itself as a linear component of advance and a rotational component of displacement about the mandrel. The tubular material must be presented at the input end of the mandrel in untwisted condition to prevent the formation of wrinkles in the material, creation of drag, distorting forces and the like. When the take-off rate varies, as when the degree of bias is changed, it is necessary to readjust the rotational feed rate of the variable speed drive. Practical experience indicates that variable speed drives are exceptionally difficult to use for this type of operation, in part because of the required preciseness of adjustment. Too frequently, the most precise adjustments are to no avail in that the smallest rotational errors become cumulative with each successive rotation. Thus, the use of a variable speed drive usually requires an operator in constant surveillance who periodically readjusts the variable speed drive such as to obtain the proper feed rate of tubular stock to the bias cutting machine.

Even the most precise adjustments of the variable speed drive, if possible to achieve, would not necessarily be effective for various qualities and kinds of materials, despite the fact that the diameter of the tube of material fed to the bias cutting machine is the same for the several qualities. For example, if a tube of a given diameter and of a given tensile strength is fed to the mandrel by the rotary delivery or feed mechanisms, it is possible to adjust the variable speed drive to take-off or wind-up the material at a rate commensurate with the feed to the mandrel. After a run with the given material, it may be necessary to bias goods of a different quality but of substantially the same diameter. If the goods of the different quality has less tensile strength, there is a tendency for the goods to elongate or stretch out during feed through the cutting zone. That is, a greater length of biased goods would be produced from the tube of the given diameter, as compared to the material of greater tensile strength. Under these circumstances, the variable speed drive has to be readjusted in that the feed rate or presentation of material in tubular form to the mandrel is too great for the take-off of biased goods. That is, more biased goods is produced than the take-off could handle for the previously established feed rate. Thus, it has been found that the operator is required to duplicate the intended function of the variable speed drive. The presence of the variable speed drive does not render the machine automatic, in that an operator must constantly be in attendance to regulate the drive or change the drive as various qualities of goods are biased, even if of the same diameter.

It is a further object of the present invention to provide an improved feeding and control mechanism for a bias cutting machine which obviates one or more of the aforesaid difficulties. Specifically, it is within the contemplation of the invention to provide for presentation or delivery of material in tubular form to the mandrel of the bias cutting machine substantially synchronous with take-off of biased material from said mandrel.

It is a still further object of the invention to provide for the controlled delivery of stock to a bias cutting machine such that the stock is available at the input end of the machine substantially free of stress or tension.

It is a still further object of the present invention to provide means for rotationally presenting material to a bias cutting machine at a rate controlled in dependence upon the take-off or wind-up of the biased material.

In accordance with this aspect of the invention, the occurrence of seams in the bias cut material is used as a standard and monitor for controlling the rotational feed or presentation of material in tubular form to the mandrel. As the bias cutting machine operates, and for each spiral or revolution of the tube of material about the mandrel, a segment of the continuous seam in the tube appears angularly across the width of the biased material. That is, for each revolution of the tubular stock about the mandrel, a seam extending angularly across the biased material is presented at or moving toward the wind-up mechanisms. The principle involved herein is that the occurrence of the seams in the biased material determines the rotational presentation of the tube of material to the mandrel to obtain distortion-free, tension-free operation.

A further feature found in many of the prior art machines is the adjustability of the take-off or wind-up mechanisms relative to the mandrel and cutting mechanisms such that the degree of biasing may be varied under control of the operator and within prescribed limits. As is well understood, the biased material may be of a "full" bias, that is with the weave at an angle of approximately 45° with respect to the cut edge of the biased material, or "under" and "over" biased with respect to "full" bias. For this purpose, known machines employ a wind-up mechanism which is pivoted at one end for movement toward and away from the mandrel to define varying angles between the wind-up axis and the longitudinal axis of the mandrel, which longitudinal axis corresponds to the linear feed path of the material along the mandrel. Pivoting of the wind-up mechanism at one end requires a relatively long throw or movement to obtain variations in bias, thus precluding the building of a compact machine. Further, a relatively long wind-up shaft is required in that for increased or decreased biases with respect to "full" bias, the wound up material does not build up symmetrically of the wind-up mechanism.

Accordingly, it is a further object of the present invention to provide a variable bias machine for bias cutting goods which can accommodate a great range of finished goods as compared to known machines and which facilitates provision of a more compact structure.

In accordance with this aspect of the invention, the take-up or wind-up mechanism is pivotally mounted substantially centrally, as contrasted to wind-up mechanisms pivotally mounted at one end and known to the prior art. By this arrangement, for a given increment of variation in the bias angle, the end of the wind-up mechanism adjacent the knife moves through a distance approximately one-half of that for the corresponding angular adjustment of a wind-up mechanism pivoted at its one end. Conversely, the end of the wind-up mechanism remote from the knife moves in a direction opposite to the first-named end and through a displacement equal to that of the first-named end. This is an advantage in that the entire wind-up mechanism can be moved closer to the mandrel by a distance of approximately one-half, as compared to a wind-up mechanism pivoted at one end and having the same provision for angular adjustment.

As the bias angle is adjusted for the bias cutting machine, the location of wind-up along the wind-up shaft is displaced axially. For example, when over biasing as compared to the location of wind-up for full or 45° bias, the cut edge emerging from the knife is displaced in one direction along the wind-up shaft from the normal location of the cut edge at full bias; when under biasing, the cut edge emerging from the knife is displaced in the opposite direction from said normal location of the cut edge. The axial shifting of the roll of biased goods for varying angular positions of the wind-up axis relative to the longitudinal and medial axis of the mandrel necessitates a wind-up shaft of a length commensurate with the limit positions of the roll for the minimum and maximum biasing. One approach to overcoming the necessity for an excessively long wind-up shaft would be to impart compound motion to the wind-up mechanism for varying angular positions. That is, for under bias conditions, displace the wind-up axially in one direction and for over biasing conditions displace the wind-up in the opposite direction. However, this would not be economically feasible and would introduce a number of complexities into the design and into operation of the machine. An inherent limitation of the wind-up mechanism which is pivoted at its end remote from the cutting knife is that the ability of the machine to handle various width goods is frequently limited by the feasible length of the wind-up shaft.

As a further feature of the invention, the provision of the centrally mounted wind-up diminishes the axial displacement of the biased goods along the wind-up axis by a factor of approximately one-half as compared to a comparable wind-up which is pivoted at its end.

In conjunction with the substantial central mounting of the wind-up mechanisms, further advantages are realized by arranging the wind-up mechanisms to extend angularly of and substantially between the sides of the mandrel. Prominent among these advantages is the relatively short free travel or traverse of biased material while unsupported. This minimizes the probability of stretching or distorting the biased material. When handling relatively soft fabrics having a low tensile strength, this becomes exceptionally important in that the biased goods is very susceptible to distorting forces and as such may be rendered completely useless by the action of the wind-up mechanism. Still further, the conjoint effect of the central pivot for the wind-up mechanisms and the optimum location of the wind-up mechanism angularly of and between the sides of the mandrel makes possible a compact construction. This results in desirable wind-up conditions compatible with the facility for adjusting the bias angle of the wind-up.

As a still further advantage realized by the compact arrangement, achieved in one form of the invention by centrally pivoting the wind-up mechanisms and disposing the same between the opposite sides of the mandrel, is the facility for initially attaching the goods to the wind-up mechanisms at the beginning of a run. To this end, as the wind-up mechanism is progressively displaced from the mandrel, it becomes more difficult for the operator to find the required location of initial attachment of the biased goods to the wind-up mechanism. The smallest angularly offsets of the goods on the wind-up shaft relative to the required position with the cut edge at substantially right angles to the wind-up shaft manifests itself, at distances progressively removed from the knife, as large axial displacements along the wind-up axis. Although, when the machine is placed in operation with the goods attached at an offset location, there is a tendency for the goods to spiral or walk along the wind-up shaft till the goods arrives in the proper position on the wind-up shaft, this progressive axial travel of the goods during the first few revolutions of the wind-up shaft is to disadvantage. Subsequent slitting of the biased goods into strips of a width which is an increment of the overall width of the biased goods, results in fall out of the tubular support at the end of the roll toward which the goods was spirally displaced due to the initial improper securement to the wind-up shaft. Thus, the slitting operation becomes materially complicated and frequently it is impossible to utilize end portions of a roll of biased goods.

In accordance with an illustrative embodiment demonstrating features of the present invention, a bias cutting machine is provided for tubular material which includes an elongated mandrel over which the material passes under substantially constant tension, a cutting knife arranged angularly of the mandrel and at one side thereof for bias cutting the tube of material, and a wind-up mechanism including a roller extending substantially across the mandrel at one end thereof, the wind-up mechanisms pulling the tube of material over the mandrel and the mandrel being relatively flat, whereby opposite side edges of the biased material lie in substantially a common plane and present substantially equal drag to the wind-up mechanisms.

As a feature of the invention, means are provided for sensing the occurrence of seams in the biased material which control the presentation of the tube of material to the mandrel such that the tube is free of wrinkles and is rotationally oriented upon delivery to the mandrel. To advantage, the mandrel includes a pair of side-forming members, which are adjustable toward and away from each other and only contact the tube at its lateral limits. Thus, very little drag is presented to the material during travel to the cutting knife.

As a still further feature of the invention, adjustment for varying the bias cut is obtained by centrally pivoting the wind-up or take-off mechanisms. Either end of the wind-up mechanisms can be swung toward and away from the cutting knife for varying the angle between the wind-up axis and the longitudinal axis of the mandrel. This adjustable arrangement of the wind-up mechanisms for changing the degree of bias is compatible with the requirement of a compact construction; further the wind-up mechanisms may be moved closely adjacent the cutting zone such that the material is wound substantially free of stretch after bias cutting.

As a still further feature of the invention, a combined static and dynamic biasing system is employed in combination with the adjustable width mandrel, such that the machine is effective in operation, yet produces only minimum stresses of the tubular material. By this feature, the adjustability of the machine is preserved over a relatively wide range, yet the goods is maintained taut during movement through the cutting zone.

Numerous advantages are realized by the construction of bias cutting machines in accordance with the present invention, including substantially automatic operation, compactness, ready adjustability for obtaining under-biased and over-biased goods, clean and true cut edges, stretch-free wind-up and others which will appear hereinafter.

Still further objects, features and advantages, as well as the foregoing brief description will be best understood by reference to the following detailed description of a presently preferred illustrative embodiment of the invention, when taken in conjunction with the accompanying drawings, wherein:

Fig. 1 is a view partially in perspective, illustrating the path of a tube of material in relation to the mandrel, and further showing the biased material in roll form;

Fig. 2 is a plan view of a bias cutting machine embodying features of the present invention;

Fig. 3 is a sectional view taken substantially along the line 3—3 of Fig. 2 and looking in the direction of the arrows;

Fig. 4 is a fragmentary elevational view, with parts in phantom and looking in the direction of arrow 4 in Fig. 2;

Fig. 5 is a plan view of Fig. 4, showing the details of the drive for the take-up or wind-up mechanisms;

Fig. 6 is a sectional view taken substantially along the line 6—6 of Fig. 3 showing details of the improved mandrel of the present invention;

Fig. 7 is a fragmentary elevational view showing still further details of the improved mandrel;

Fig. 8 is a fragmentary sectional view taken along the line 8—8 of Fig. 7;

Fig. 9 is an elevational view looking in the direction of arrow 9 of Fig. 2;

Fig. 10 is an fragmentary elevational view with parts in section showing the cutting knife and mount therefor;

Fig. 11 is a plan view of the knife and mount shown in Fig. 10;

Fig. 12 is a plan view with parts broken away and sectioned, showing details of the wind-up shaft and the drive mechanisms therefor;

Fig. 13 is a plan view with parts broken away showing the wind-up shaft released from the normal operating position illustrated in Fig. 12 and conditioned to receive a sleeve or the like for wind-up of the biased material thereon;

Fig. 14 is a sectional view taken substantially along the line 14—14 of Fig. 12 and looking in the direction of the arrows;

Fig. 15 is a plan view on an enlarged scale showing details of a seam-sensing device embodying features of the present invention and located in the wind-up mechanisms for the biased material;

Fig. 16 is a sectional view taken substantially along the line 16—16 of Fig. 15;

Fig. 17 is an elevational view of the apparatus embodying further features of the invention for presentation of material in tubular form to the mandrel;

Fig. 18 is a front elevational view of the apparatus shown in Fig. 17 as seen from the adjacent end of the mandrel;

Fig. 19 is a schematic diagram of a typical control circuit in accordance with the present invention; and, Fig. 20 is a fragmentary elevational view showing a modified seam-sensing device in accordance with further features of the present invention.

Referring now specifically to the drawings, and particularly to Figs. 1 and 2, there is shown a bias cutting machine which illustrates principles of the present invention and includes an elongated, relatively flat mandrel 30, material delivery or presenting apparatus 32 adjacent the leading or forward end of the mandrel 30, a cutter 34 at one side of and adjacent the trailing or rear end of the mandrel 30, and angularly-disposed wind-up or take-up mechanisms 36 generally extending across the mandrel 30. The delivery or presenting mechanism 32 is arranged to rotationally orient material M seamed into tubular form and supported in a roll, generally designated by the letter R, relative to the mandrel 30. The take-off or wind-up mechanism 36 rewinds the biased material B in the form of a roll R' and advances the tube in a spiral direction, as indicated by the arrows in Figure 1, through the cutting zone or region and past the cutter 34. As is well understood, the longitudinal feed rate of the goods over the mandrel 30 is determined by the pull exerted by the wind-up mechanisms 36 and the angular location of the pulling axis relative to the longitudinal or medial axis of the mandrel 30. The material M is formed into tubular configuration by known mechanisms, as by taking material, seaming the same together along opposite side edges to form a longitudinally extending seam S, and opening the seam S by turning back its margins.

Figs. 3 to 9 inclusive show the details of the mandrel 30 and the take-up or wind-up mechanism 36. Specifically, the bias cutting machine includes a main base plate 38 which is stationary and supports an upright frame 40 carrying at one side thereof a supporting arm 42. Mounted on the supporting arm 42 is a stationary side bar 44, defining one lateral limit or side of the mandrel 30. Arranged in substantial parallelism with the stationary side bar 44 is an adjustable side bar 46 which is movable toward and away from the stationary side bar 44. The adjustable side bar 46 is carried on a cantilever support including a cross bar or beam 48 extending into a slide block 50. Journalled in the slide block 50 are bearing or roller contacts 52 which engage the upper, lower and side faces of the cantilever-supported cross bar 48.

Operatively connected to the end of the cross bar or cantilever support 48 is an adjustable dynamic tensioning system 54 including a chain 56 extending through the slide block 50 and trained over an idler pulley 58. The chain carries a depending scale hanger 60 for selectively receiving weights 62 thereon. Lateral adjustment of the stationary and movable guide bars 44, 46 relative to each other permits the accommodation of various widths of tubular material M as will appear hereinafter. The provision of the cantilever support is to advantage in that the range of adjustment of the mandrel 30 can be between any desired limits as compared to adjustable mandrels known in the prior art.

In conjunction with the adjustable dynamic tensioning system 54, means 55 are provided for applying a static bias or drag to the movable side bar 46 of the adjustable-width mandrel 30. The static biasing means 55 counteracts movement of the adjustable side bar 46 toward and away from the fixed side bar 44, yet conjointly with the dynamic bias of the adjustable tensioning system 54, results in a loading differential which manifests itself as a force tending to move the adjustable side bar 46 outwardly and away from the fixed side bar 44. This differential bias maintains the tube or bag of material M taut during movement through the cutting zone 64. For example, if the pulling tendency of the wind-up mechanisms to be described in detail hereinafter, exerts a uniform pull of four pounds which tends to collapse the adjustable width mandrel 30, and a desirable tensioning load on the tubular material M is one-half a pound, then a dynamic weight of two and one-half pounds is placed on the depending scale or hanger 60, while a two pound static drag is exerted on the cantilever cross-bar by the static bias means 55. The pressure differential biasing the adjustable side bar 46 outwardly is one-half a pound, while the wind-up mechanism is pulling against an effective load or reacting force of approximately four and one-half pounds. This contrasts markedly to a system in which the static biasing means 55 is not present.

For example, the dynamic tension exerted on the tube at side bar 46 would have to be approximately four and one-half pounds to avoid collapse of the mandrel. This relatively large load might produce excessive stretching or stressing of the material. Such excessive stressing frequently results in elongation of the biased material, which elongation produces distortion, and untrue biased material of a width less than that anticipated for the given biasing conditions.

In the illustrative form, the static biasing means includes a presser shoe or pad 57, as of leather or fiber, a tension spring 59, and an adjusting screw 61 connected to the spring 59 for adjusting the tension exerted on the presser foot 57.

As seen in Fig. 2, the side bars 44, 46 of the mandrel are not exactly in parallelism, that is the stationary side bar 44 is slightly convergent toward the movable side bar 46 at locations progressively removed from the cutting zone 64 toward the leading or front end of the mandrel 30. Thus, the material in tubular form is rendered taut only across the cutting zone 64 as indicated by the double set of arrows in Fig. 2 and for a short distance along the mandrel in advance of the cutter 34. The tube of material is in substantially slackened condition during feed over the mandrel 30 in advance of the cutting zone 64, reducing friction or drag to a minimum.

Since the mandrel 30 is of relatively flat cross-section, the material M is maintained in the form of a relatively flat tube, with upper and lower faces substantially in parallelism, and supported only by curved portions wrapped around the respective side bars 44, 46. This further contributes to reduction of drag or friction. Further, and as seen best in Fig. 2, the forward or leading ends 44a, 46a of the side bar 44, 46, are enlarged and curved inwardly to present continuous surfaces to the tube of material being delivered to the mandrel. Still further as an aid in reducing friction, the curved portions of the side bars 44, 46 which come into contact with the material M may be highly polished and/or provided with appropriate anti-friction coatings, such as known chemical compositions. With suitable weights 62 in the combined dynamic and static tensioning systems 54, 55 for a tube of material of a given diameter, the mandrel will keep the tube of material in an even state of tension in the cutting zone 64, minimum friction losses being presented to the tube in advance of the cutting zone 64.

The cutter 34 is removably supported on a pedestal support 66, as seen best in Fig. 9, and is driven by a motor 68 supported on a motor bracket 70. The motor 68 is vertically adjustable in relation to the horizontal plane H defined by the upper surface of the flat mandrel 30. The vertical adjustment of the cutter is to compensate for wear and is accomplished by provision of a depending extension 72 mounted in a seat 74, and an adjustable turn screw 76 tapped into the upper end of the pedestal support 66 and serving as a bearing support for the motor bracket 70. The drive shaft 68a of the motor 68 extends generally toward the adjacent stationary side bar 44 of the mandrel 30 and carries a disc or circular cutting blade 78. The cutting blade 78 has an appropriate circumferential cutting edge which depends into a cutout 80 formed in the side bar 44. The cutout 80 extends at approximately an angle of 45° to the axis of the side bar 44 and extends for a depth sufficient to provide clearance for the cutting blade 78 which extends generally below the horizontal plane H defined by the upper face of the tube of material and the mandrel 30. The blade 78 is driven by the motor 68 from a source of electrical energy, not shown, and is effective to sever the tube of material along its upper face or run as the same is spirally advanced along the mandrel 30 through the cutting zone 64.

The wind-up or take-up mechanism 36 is supported on a frame 82 including side members 84 fixed to and extending upwardly from an auxiliary base plate 86 which is pivotally supported on the main base plate 38 of the machine. The entire wind-up mechanism is turnable about the vertical axis coinciding with the upstanding pivot bolt 88 interconnecting the base plates 38, 86. Appropriate means are provided for rotating the wind-up frame 82 about the vertical axis 88, such as the lockable rack and pinion arrangement shown best in Fig. 9. An appropriate turning wheel 90, which may be manually rotated, is fixed to the pinion 92 journaled about a fixed axis on base plate 38. Upon rotating the pinion 92, various angular adjustments are obtained for the wind-up mechanism in relation to the mandrel 30. The pinion 92 engages a curved rack 94 which in turn is fixed to the movable auxiliary base plate 86.

Extending between the upper ends of the side members 84 is a horizontally-extending combined pulling, driving, and wind-up feed roller 102 which is of relatively large diameter and has its outer surface knurled. As seen best in Fig. 3, the lower periphery of the roller 102 lies in the horizontal plane H of the upper face of the mandrel 30 and the axis of the main wind-up roller 102 extends substantially parallel to the line of demarcation 104 between the tubular material M and the biased material B. As seen best in Fig. 5, the roller 102 is driven from a motor 106 which is coupled directly to the shaft or axle 110 of the roller 102 via an appropriate gear reduction mechanism 108.

Mounted above the roller 102 is a wind-up shaft 114 which is supported on a pivoted and counterbalanced frame 116. As seen best in Fig. 2, the frame 116 includes a pair of side arms 118, 120 pivoted on appropriate stub shafts 122 at a location substantially midway between the wind-up shaft 114 and a counterweight bar 124. The wind-up shaft 114 is adapted to receive a wind-up tube 126, as of cardboard or the like, upon which the biased material B is rolled after being drawn through the bias cutting machine by the wind-up mechanism 36.

An appropriate drive is provided for the wind-up shaft 114 such that the constant speed wind-up may be attained in conjunction with the main drive roller 102. The driving connection includes the main sprocket 128 on the motor shaft which is coupled to the sprocket 130 of an idler gear 132 by a chain 133. The idler gear 132 is coupled to a further idler gear 134 fixed to an idler sprocket 136 carried on the stub shaft 122. The idler sprocket 136 is coupled to a further idler sprocket 138 through a chain 140. The further idler sprocket 138 is loosely journaled on an intermediate shaft 142 coupled to the take-up shaft 114. The idler sprocket 138 is connected to the coupling shaft 142 through a friction drive or slip clutch 144, seen best in Fig. 12. The friction drive 144 includes a clutch plate 146 having a friction ring 148, as of leather, in contact with the driving face 138a of the sprocket 138. The clutch plate 146 is keyed to the intermediate shaft 142 for longitudinal movement and along with the friction ring 148 is biased into engagement with the driving face 138a of the sprocket 138. Biasing is through provision of a spring 150 which may be progressively tensioned by an adjustable threaded stop collar 152 supported on a threaded extension 154 of the intermediate shaft 142. Through the slip clutch, well known per se, the rate of drive is controlled by the speed of the wind-up roller 102 such that substantially uniform take-up is maintained despite buildup of the bias cut goods B on the take-up shaft 114.

Advantageously, and as seen best in Figs. 12 and 13, the take-up shaft 114 is constructed such that the roll-supporting tube 126 may be inserted thereon when empty and removed therefrom when the bias cut material B is wound thereon. To this end, the wind-up shaft 114 includes a universally-mounted main shaft element 160 which is pivotally supported on a cylindrical plug 162 journaled within a coupling head 164. The head in turn is rotatably mounted on the counterbalanced frame 116 by an appropriate bearing 166. The end of the main shaft element 160 remote from the supporting plug 162 is formed with a male lock finger 168 which is receivable within a female keeper slot 170 on a further coupling head 172 integral with or operatively connected to the intermediate shaft 142. Journaled on the intermediate shaft 142 and maintained against displacement therealong is a rotatable locking sleeve 174 provided with a radially-extending entry slot 176. The entry slot 176 may be brought into registry with the locking slot 170 of coupling head 172 by rotation of the locking sleeve 174. When the slots 170, 176 are in registry, as seen in Fig. 13, the male locking finger 168 may be removed from the coupling head 172 to release the take-up shaft 114 for universal movement. Thus, the main shaft element 160, which receives and supports the tube 126 upon which the biased material B is wound, may be freed from the engaged position with the coupling head 174 to receive the tube 126 thereon. When the tube 126 is placed about the main shaft element 160, the take-up shaft 114 may be locked in position as seen in Fig. 12 by reinserting the lock finger 168 into the seat 170 and moving the locking sleeve 174 such that the entry slot 176 is once again out of registry with the seat 170.

To selectively obtain tight wind-up of the roll R', an adjustable braking unit 180 is operatively connected to the pivot 122 of the counterbalanced frame 116. As seen best in Fig. 9, the braking unit 180 includes a pulley 182 fixed to pivot 122 and about which is trained a belt 184, as of leather or other similar material. The belt 184 is anchored to the frame 82 of the wind-up mechanism at one of its ends by the bracket 186 and has its other end connected to an adjustable tightening unit 188. The adjustable tightening unit 188 consists of a supporting bracket 190 which carries an upstanding threaded lead screw or shaft 192 having a follower nut 194. The follower nut 194 is connected to the other end of the belt 184 through a coupling arm 196, the lead screw being provided with a turn wheel 198. The load exerted on the pivot 122 for the counterbalanced frame 116 prevents free turning of the counterbalanced frame 116. Accordingly, the tightness of the roll R' being wound on the take-up shaft 114 may be controlled. That is, the greater the friction or drag exerted by the braking unit 180, the greater the frictional contact between the outer periphery of the roll R' and the driving roller 102 as the roll builds up on the wind-up shaft 114. As seen in Figs. 3 and 9, the line of peripheral contact between the roll R' being built up and the driving roller 102 is at a point well removed from plane H of the upper face of the mandrel 30 and the lower periphery of the wind-up roller 102. The arrangement is such that there is approximately a 180° wrap between the peripheral line contact to the roller 102 of the biased material B and the further peripheral line contact between the roller 102 and the roll R' being wound on the take-up shaft 114. This substantial wrap about the combined pulling, driving and wind-up feed roller 102 prevents the material from slipping relative to the driving surface of the roller 102. By the described arrangement, the biased material may be wound on the take-up shaft 114 as desired without introducing stretches or tensions into the biased material.

As seen in Figs. 2 and 3, the peripheral pickup line of the driving roller 102, which lies in a vertical plane common with the axle 110 is exceptionally close to the line of demarcation 104 between the region in which the material is in tubular form and the region in which the material is in bias cut form. Thus, after being cut, the biased material has an exceptionally short free traverse before being completely supported by the roller 102. For a machine designed to cut 45° bias or less, optimum stretch and distortion free wind-up would be attained if the roller 102 is placed with its shaft 110 coinciding with the drive shaft 68a of the cutter 34. By this expedient, as the biased goods emerges along the line of demarcation, said goods would be immediately supported by the roller 102. Thus the roller 102 would pull straight material M, yet feed biased material B to the wind-up.

Referring now specifically to Figs. 17 and 18, there is shown the details of the tube feeding or presenting apparatus 32 at the forward or leading end of the mandrel 30. The material feeding apparatus includes a base plate 200 carrying an upstanding frame 202 formed with an arcuate slot 204. Supported on the base plate 202 is a rockable platform 206 which is pivotally supported for movement about a shaft or axle 208. The rockable platform carries an upstanding arm 210 which projects above the upper end of the frame 204. The upstanding arm 210 supports a threaded bolt 212 which extends through the arcuate slot 204 and receives a lock nut 214. The curvature of the slot 204 is selected as an arc of a circle about the pivot 208 and has a relatively long radius such that the arm 210 may be fixed in various lateral positions to the left and right of the central position illustrated in Fig. 18. On the upper end of the arm 210 is supported a turn buckle 216 which is pivoted on a drive shaft 218 journaled in a sleeve bearing 220 carried by the arm 210. The turn buckle removably supports the goods to be biased which, as previously pointed out, is material in seamed tubular form and wound into a roll R. The axis of rotation of the turn buckle 216 which coincides with the supporting shaft or axle 218 is movable to the left and right to lie along the longitudinal medial axis of the adjustable-width mandrel 30 through provision of the rockable platform 206 and releasable locking arrangement 204, 214. Thus, as the width of the mandrel 30 is varied by displacement of the adjustable side bar 46 in relation to the fixed side bar 44, the pivot axis of the turn buckle 216 may likewise be varied. It is to be observed that the slight curvature of the slot 204 causes unappreciable raising and lowering of the axis of the turn buckle 216 in relation to the mandrel 30 and is of no significance in operation of the machine.

Drive is imparted to the shaft 218 of the turn buckle from a variable speed motor 222 through a gear reduction unit 224, pulleys 226, 228 and a belt 230 trained around the pulleys. The pulley 228 is connected to the turn buckle shaft 218 concentrically with a commutator drum 232 including spaced apart conductive commutator rings 234, 236. The commutator rings 234, 236 are electrically connected together, with the commutator ring 234 being formed with an opening or gap 238. Operatively associated with the motor 222 is a magnetic brake 240 which is in the braking or holding condition when deenergized and is in the released condition when energized to permit rotation of the motor 222. Controlled energization of the magnetic brake 240 is through brushes 242, 244, which are in contact with the commutator rings 234, 236 and in the control circuit illustrated in Fig. 19.

As seen in Fig. 19, a pair of input lines 246, 248 are connected to a suitable source of electric current and feed the main coil 250 of a normally open solenoid controlled switch 252 through a microswitch 264. The switch 252 includes an auxiliary or holding coil 254 having one end connected to the brush 242 of split commutator ring 234 and having its other end connected to one side of the parallel motor and brake circuits. The other side of the parallel motor and brake circuits is connected through terminal 262, the movable contactor 256 and terminal 260 to the other input line 248. The movable contactor 256 of the switch is supported on a solenoid plunger 258 and contacts the fixed terminals 260, 262 in response to energization of the main coil 250. Thus, upon closing of the microswitch 264 the main coil 250 is energized, thus closing the switch 252 and energizing the holding coil 254. As will be subsequently understood, the microswitch 264 is only momentarily closed in that it responds to the detection of a seam at the wind-up roller 102. Thus, when a seam momentarily closes the microswitch 264, the primary coil 250 is energized, closing the switch 252 and energizing the secondary coil which is connected across the lines 246, 248 by the following path: Line 248, terminal 260, movable contactor 256, terminal 262, coil 254, commutator brush 242, split commutator ring 234, the continuous commutator ring 236, commutator brush 244, and return to the other line 246.

It will be appreciated that upon the gap or discontinuity 238 being presented under the brush 242, the energization circuit for the holding coil 254 will be interrupted. This, in turn, will cause release of the solenoid and movement of the contactor 256 away from the stationary terminals 260, 262, thus causing the magnetic brake to be effective to discontinue motor drive to the driving pulley 228 of the turn buckle 216. However, upon reclosing of the microswitch 264 for a relatively short interval, the cyclic operation will be repeated. The gap 238 is relatively short such that it is effective to cause an interruption of the energization circuit for the auxiliary or holding coil 254, yet its brush 244 ends up on the continuous portion of the ring 234, such that upon reclosing of the microswitch 264 the circuit for the holding coil 254 is conditioned for energization. In operation, the turning of the turn buckle 216 to present goods in untwisted condition to the input end of the mandrel is such that upon sensing of a seam, as will be described hereinafter through closing of the microswitch 264, the turn buckle is rotated at a rate such that the goods is presented in untwisted condition, or with a slight overtwist to the mandrel 30. The rate of rotation for the turn buckle 216, of course depends upon the take-up rate of the wind-up mechanism 32. That is, the goods has two components of motion relative to the mandrel 30, one being a linear component of displacement along the length of the mandrel and the other being a rotational component about the mandrel. The turn buckle 216 is made to turn at a rate substantially equal to or a little faster than the rotational displacement of the tube of goods about the mandrel to present the goods at the input end of the mandrel substantially free of tension and in untwisted condition. In the preferred form of the invention, the turn buckle is rotated at a rate slightly faster than the spiralling of the goods about the mandrel so that the turn buckle completes its rotation slightly in advance of the travel of the goods, thus imparting a slight overtwist to the goods. Thus, the discontinuity or gap 238 of the commutator ring 234 is presented to the brush 242 slightly in advance of the sensing of the next seam by the microswitch 264. This causes momentary interruption of the drive to the turn buckle until sensing of the seam by the microswitch 264. There is no possibility of cumulative error in that the feed or presentation is corrected for every cycle of operation in dependence upon the take-off rate as determined by monitoring of successive seams S appearing in the biased material B. In that the gap or discontinuity 238 in the ring 234 is only slightly wider than the width of the corresponding brush 242, the momentum of the turning shaft 218 carries the gap 238 past the brush 242 with the ring 238 coming to rest in a condition wherein the circuit is conditioned for the next seam sensing. It will be appreciated that the circuit described herein is purely illustrative and is one of but many electrical control circuits which may be employed for coordinating the rate of presentation of the tubed goods to the mandrel with the take-off as sensed or determined by the occurrence of successive seams in the biased goods. The construction of the magnetic brake is well known and will not be detailed herein. Further, appropriate speed controls may be provided for the motor 222 as is also well understood in the art.

Referring now specifically to Figs. 15 and 16, there is shown one form of detecting or sensing mechanism 266 which incorporates a microswitch 264 having an actuator 264a. The detector 266 is located adjacent the roller 102, and is adjusted in relation to the segment of the seam S, as indicated by the directional arrow in Fig. 15. Specifically, the detector includes an actuator arm 268 pivoted on a bracket 270 of base plate 282 closely adjacent one end of the arm. The actuator arm 268 includes an operating head 272 at the end remote from the pivot such that a relatively short throw or displacement of the arm adjacent the pivot will manifest itself as a correspondingly longer displacement of the head 272. Accordingly, the sensing of relatively thin seams closely adjacent the pivot will cause a relatively long displacement of the head 272 toward the actuator 264a of the microswitch 264. On the base place 282 is a spacer roller 276 which is offset from a seam-sensing roller 278 on the actuator arm 268. The spacer roller 276 (see Fig. 16) is journaled on an upstanding arm integral with the bracket 270 and is rotatable about an axis parallel to the axis of rotation of roller 278. The spacer roller 276, which trails the seam-sensing roller 278, determines the position of the actuator arm 268 in relation to the goods wrapped around the wind-up roller 102. The spacer roller 276 bears against the material B to initially orient the sensing device for a given thickness of material and maintain the gap between the head 272 and the actuator 264a constant for various thickness of material. That is to say, the innermost position of the actuator arm 268 under the bias effect of the spring 280 is determined by the roller 276, while the seam-sensing roller 278 will cause a displacement of the actuator arm away from the roller 102 when a seam is presented therebeneath. As the seam progresses in the direction of the arrows indicated in Fig. 15, the seam-sensing roller 278 is displaced inwardly against the biasing effect of the spring 280 which inward displacement manifests itself as a relatively long throw of the head 272 contacting the same against the microswitch actuator 264a. As the microswitch actuator 264 causes closing of the microswitch 264, the circuit operates as aforesaid.

In order to facilitate handling of material of different thicknesses, the entire seam-sensing assembly is supported on a base plate 282 mounted on a slideway 284 for movement toward and away from the roller 102 along a path extending at right angles to the axis of rotation of the roller 102. A biasing spring 238 normally serves to maintain the base plate or bracket 282 in an inner position along the slideway 284. Thus for a given thickness of material, the entire seam-sensing assembly supported on the base or bracket 282 is biased inwardly until the thickness-sensing roller 276 abuts the material. When in adjusted position as illustrated in Figs. 15 and 16, the seam-sensing roller 278 is in position to cause the required displacement of the actuator arm 268 to effect closing of the switch 264.

In lieu of the slidably supported seam-sensing mechanism illustrated in Figs. 15 and 16, it may be desirable to use the pivotally supported seam-sensing device shown in Fig. 20. As seen in Fig. 20, a modified seam-senser 290 may include a rockable frame 292, mounted on a pivot or stud 294 attached to the machine frame such that the rockable frame may be rocked toward and away from the roller 102. Appropriate biasing means such as the spring 296 is provided between the rockable frame 292 and the machine frame to normally bias the rockable frame toward the roller 102. On the rockable frame is the microswitch 264' including its actuator in position beneath the actuator arm 298. The actuator arm 298 carries the seam-sensing roller 300 which is pivoted thereon, while the rockable frame 292 carries the orienting or thickness-sensing roller 302. As previously described, the seam-sensing roller 300 is presented to the seam before the thickness-sensing roller 302 which merely serves to automatically adjust the position of the frame 292 for a given thickness of goods. This construction is the same as the seam-sensing illustrated in Figs. 15 and 16, in that the frame 292 is automatically adjusted in relation to the roller 102 by the action of the spring biased frame in conjunction with the spacer roller 302. The bodily substitution of the seam-sensing device illustrated in Fig. 20 in the environment of Figs. 15 and 16 may be readily apparent and the operation in the circuit of Fig. 19 should be clear. Accordingly, further description is dispensed with.

A typical cycle of operation will now be described in detail, together with the various adjustments that can be made for different materials and biasing conditions:

At the outset, the material supply or delivery apparatus 32 is adjusted such that the center of rotation 218 of the turn buckle 216 is in substantial alignment with the longitudinal medial axis of the mandrel for the given tube of material to be biased. When the required orientation of the turn buckle 216 relative to the mandrel 30 is obtained, the lock nut 214 is tightened down, such that the turn buckle is fixed in position.

Thereupon, the required load is placed upon the hanger 60 of the dynamic tensioning system 54 and the static biasing means 55 such that sufficient static bias is presented to the wind-up or take-up mechanisms 36, yet the required tension but stretch-free loading is applied to the tube of material passing over the mandrel. For each given type of material, different static and dynamic loads or biases will be employed.

The required angular adjustment of the take-up or wind-up mechanisms 36 relative to the mandrel is achieved by turning of the hand wheel 90, to obtain a desired bias angle with respect to full or forty-five degree bias. In this connection, it is to be stressed that the take-up or wind-up mechanisms are as close to the line of demarcation 104 between the tubular formed goods M and the bias cut goods B as is permissible in accordance with the desired range of adjustment. That is, as the adjacent end of the roller 102 moves closer to the cutting knife 78, under biasing of the goods is obtained. The maximum inward traverse of the end of the roller 102 adjacent the knife will be such that at the minimum bias angle, the periphery of the main wind-up roller 102 is as close to the cutting knife as is physically possible. Conversely, for over biasing of the material, the end of the roller 102 remote from the cutting knife will be critically positioned in relation to the adjacent point of emergence of the bias cut goods from around the outer or adjustable side bar 46 of the mandrel 30. That is, the innermost movement of this end of the roller 102 is limited by the location at which the goods would tend to fall back upon itself and not wind properly.

Having thus established the required mechanical constants for the machine and with a sensing mechanism appropriate to the thickness of material being employed, the timing of the turn buckle for movement in relation to the take-off rate is established. As previously pointed out, the timing is such that both the cycle of the turn buckle and the movement of the seam through the cycle begin at substantially the same instant in time. By this expedient, the tube of material being delivered to the mandrel at the outset will be in unwrinkled condition. As the first cycle of the machine progresses, operation of the turn buckle is such that the rotation of the feeding roll R gets slightly ahead of the movement of the tube of material around the mandrel, such that the commutator interrupts the movement of the turn buckle at some time in advance of the sensing of the seam for the next cycle or spiral traverse of the material. Thus, the material is delivered or presented to the mandrel in substantial rotational synchronism with a slight lead or overtwist. As previously pointed out, the degree of lead is selected such that excessive overtwisting of the goods is completely avoided. Having established the rotational feed rate of the turn buckle relative to the take-off rate of biased goods as determined by the wind-up mechanisms, the machine is in condition for operation.

The material in tubular form M is passed over the mandrel, fed around the roller 102, and then secured to the tube 126 on the wind-up shaft 114. Upon energization of drive motor 106 the cutter motor 68, as well as the variable speed motor 222 and magnetic brake 240 operation is begun. As the machine starts, the turn buckle presents goods in untwisted condition or with a slight overtwist to the mandrel. As the end of the first cycle approaches, the discontinuity or gap 238 in the commutator 234 deenergizes the winding 254 of the switch 252 and thus causes the magnetic brake to become effective to instantaneously stop the turn buckle. As shown in Fig. 19, the microswitch 264 is open in that a seam has not been detected by the seam-sensing mechanism.

Upon sensing of a seam, at the end of a spiral traverse of the material, the microswitch 264 is effective to again energize the relay, thus bringing the movable contactor 256 against the stationary terminals 260, 262. In this instantaneous condition with the microswitch 264 closed, it is to be noted that the brush 242 is again on the continuous portion of the commutator ring 234 in that when the discontinuity 238 was sensed, the gap was sufficiently long enough to effectively deenergize the coil 254, yet such that the brush ended up in contact with the ring 234. Upon instantaneous closing of the microswitch 264 and closing of the switch 252, a circuit is completed for the holding coil 254 which circuit is closed during the cycle, as previously set forth. Although the control mechanism is described as of the start-stop variety, it is to be appreciated that the starting and stopping is virtually instantaneous and that the system appears to be continuously operating.

In the event that the roll R' is not sufficiently tight, it is merely necessary to increase the loading or drag on the counterbalanced frame 116. This is accomplished by turning of the lead screw 192 of the tightening unit 188 to pull downwardly on the strap or band 184. With increased drag or loading of the counterbalanced frame, as the roll R' builds up on the wind-up shaft, its upward movement is resisted by the applied counteracting force. The friction drive 144 for the wind-up shaft 114 may be tightened to provide an increased frictional driving force, which conjointly with the loading of the counterbalanced frame causes tightening of the roll R'. It is to be stressed that tightening of the roll R' in no way introduces stresses or tensions into the biased goods. That is that the tensioning system 188 does not cause relative displacement between the biased goods B and the roller 102. The goods is wound in unrelieved condition as when engaged by the roller 102 in the line contact of plane H.

If needed, provision may be made between the upright arm 210 of the material presenting apparatus 32 and the commutator 232, to permit the commutator 232 to be rotationally oriented for various positions of the turn buckle 216, such that the turn buckle stops in required orientation relative to the position of the material about the mandrel when a seam is sensed. At the instance of seam sensing, the turn buckle 216 should be oriented relative to the mandrel such that material is delivered in untwisted condition.

It will be appreciated that the compact arrangement of the wind-up mechanisms relative to the mandrel facilitates threading of the machine from either side of the machine, that is, to the left and right as shown in Fig. 9. When threading from either side, the operator can collapse the adjustable side bar 44 toward the stationary side bar 46, slip the tube or bag of material over the mandrel, allow the movable side bar to distend or stretch the bag to its required tensioned condition, and finally secure the leading end of the bag to the wind-up mechanism.

The width of the material in the biased and tubular form can be varied over an exceptionally broad range, the lower limitation being that imposed by the proximity to which the movable side bar may be brought in relation to the fixed side bar, and the upper limit being determined by the practical ability to provide the required cantilever support for the movable side bar 46.

Additionally, the illustrated mandrel construction is to advantage in that it reduces frictional drag to the minimum, contrasting and distinguishing from mandrel constructions employing large surface areas in contact with the tube of material. It is to be further noted that the support for the movable side bar is beyond the limits of the mandrel and at a location beyond the cutting zone wherein the goods is no longer in tubular form but is bias cut. As such, the cantilever support may be of any length and in no way interferes with the operation of the machine.

It is to be expressly understood that other forms of adjustable width mandrels are within the scope and contemplation of the present invention, which mandrels will be adjustable over an exceptionally broad range. For example, in lieu of the cantilever support extending transverse to the side bars, the movable side bars could be mounted by a sliding or pivot support to the base of the machine with said support being outside the limits of the mandrel. Although the seam sensing mechanisms are illustrated at the transfer location adjacent the roller 102, whereat the goods are biased cut, it is to be understood that the seam senser could be located along the mandrel in contact with the goods in tubed form. The manifest purpose of the seam senser is to measure the rotational traverse of the goods relative to the mandrel which traverse will be the same for both the bias cut goods and the unbiased goods. The details of the seam sensing mechanisms are illustrative of the several forms which the same may take. The form illustrated in Fig. 20 is presently preferred, constructed with the rollers 300, 302 disposed at equal radii relative to the pivot 294.

It is to be further observed that the combined static and dynamic loading system for the mandrel finds equal application with other mandrel constructions. To prominent advantage, the combined static and dynamic loading which achieves many advantages, may be used with mandrels of the type having a gravity bar, known in the prior art.

In the appended claims, the recitation of a cutter adjacent one end of the mandrel should be construed as a cutter at a location corresponding to the effective end of the mandrel, that is where the goods emerges as bias cut material. Further, the term "cyclically operable" as applied to the turnbuckle should be afforded an interpretation consistent with correction of the rotational orientation of the turnbuckle during each cycle, or periodically, that is one or more corrections in any number of cycles. Still further, the arrangement of the windup mechanisms as extending over and across the mandrel may be expressed alternatively by the recitation that the windup mechanisms has a roller which receives bias cut material within prescribed lateral limits, and that the longitudinal center line of the mandrel intersects the axis of the roller within the prescribed lateral limits (see Fig. 2).

Numerous modifications of the apparatus of the present invention will occur to those skilled in the art, and accordingly the appended claims should be given a latitude of interpretation consistent with the disclosure, and at times certain features of the invention will be used without a corresponding use of other features.

What I claim is:

1. A bias cutting machine for material in seamed tubular form comprising an elongated mandrel, cutting means adjacent one end of said mandrel for severing the material in tubular form passing over said mandrel into bias-cut material, take-off mechanisms adjacent said one end of said mandrel for removing bias-cut material from said mandrel at a predetermined rate, means for presenting the material in seamed tubular form to the other end of said mandrel for pull over and along said mandrel by said take-off mechanisms, means at a point along the path of travel of the material through the machine for sensing the movement of seams in the material past said point, and means under control of said sensing means and operatively connected to the presenting means for controlling the presentation of the material in seamed tubular form to said mandrel in dependence upon travel of said seams past said point.

2. In a bias-cutting machine, an elongated relatively flat mandrel over which goods pass under substantially constant tension, said mandrel being of adjustable width and having a center line, a cutting knife arranged angularly of said mandrel and at one side thereof for bias cutting goods, and a windup mechanism including a roller extending substantially across said mandrel at one end thereof, the center line of said mandrel in any position of adjustment intersecting said roller at a point within the lateral limits of said roller which receives bias cut goods.

3. A machine for bias cutting a seamed tube of material comprising a mandrel, cutting means on said mandrel for severing said tube into bias-cut material while passing over said mandrel, take-off mechanisms for removing bias-cut material from said mandrel, said take-off mechanisms being arranged at an angle relative to said mandrel and moving said tube along a path of travel relative to said mandrel, feed means for rotationally presenting said tube to said mandrel for pull over and along said mandrel by said take-off mechanisms, means at a point along said path of travel for sensing the movement of seams in the material past said point, and means under control of said sensing means and operatively connected to said feed means for controlling the rotation of said feed means in dependence upon sensing of seams in the material.

4. In a machine for bias cutting material comprising a mandrel having a tensioning member movable radially inwardly and outwardly of the center of said mandrel, a cutting knife arranged angularly of said mandrel for bias cutting material, and a windup mechanism for pulling a tube of material over said mandrel and past said cutting knife, and loading means acting on said tensioning member and including a live load operatively connected to said tensioning member and urging said tensioning member outwardly of said mandrel and a dead load operatively connected to said tensioning member and resisting movement of said tensioning member both inwardly and outwardly of said mandrel, the difference between said dead and live loads providing tension on said tube of material and the summation of said dead and live loads providing a reacting force to the pull exerted by said windup mechanisms.

5. In a machine for bias cutting material including a mandrel, a cutting knife arranged angularly of said mandrel for severing material, and windup mechanism for pulling a tube of material over said mandrel, said mandrel comprising a stationary side bar and a movable side bar extending substantially parallel to said stationary side bar and movable toward and away from said stationary side bar, combined static and dynamic loading means acting on said movable side bar providing tension on said tube of material and a reacting force to the pull exerted by said windup mechanism, said combined static and dynamic loading means including a first load operatively connected to said movable side bar and resisting motion of said movable side bar both toward and away from said stationary side bar, and a second load operatively connected to said movable side bar and urging said movable side bar away from said stationary side bar.

6. In a machine for bias cutting material including a mandrel, a cutting knife arranged angularly of said mandrel for severing material and windup mechanism for pulling a tube of material over said mandrel, said mandrel comprising stationary and adjustable bars, means mounting said adjustable bar for movement relative to said stationary bar, and a loading system acting on said adjustable bar providing tension on said tube of material and a reacting force to the pull exerted by said windup mechanism, said loading system including adjustable means operatively connected to said adjustable side bar and creating a drag on the mounting means for said adjustable bar and resisting movement of said adjustable bar, and further adjustable means operatively connected to said adjustable side bar and urging said adjustable bar away from said stationary bar.

7. In a bias-cutting machine, an elongated relatively flat mandrel over which a tube of material passes under substantially constant tension, a knife arranged angularly of said mandrel at one side thereof for bias cutting said tube of material, a windup mechanism arranged at an angle relative to said mandrel and including a roller extending substantially across and over said mandrel, and means including a pivot substantially midway between the ends of said roller mounting said windup mechanism for angular adjustment relative to said mandrel through a selected range, said flat mandrel presenting substantially uniform drag from side to side to said windup mechanism, the bias cut material coming from said mandrel along a line of demarcation substantially parallel to the axis of said roller, the spacing between said line of demarcation and the axle of said roller being selected to permit angular adjustment of said windup mechanism through said selected range without contact of said roller against said knife.

8. In a bias-cutting machine for a tube of material, an elongated mandrel over which material passes under substantially constant tension, a cutting knife arranged angularly of said mandrel at one side thereof for bias cutting said tube of material, a windup mechanism including a roller extending substantially across and over said mandrel at one end thereof, said windup mechanism pulling said tube over and along said mandrel and said mandrel being relatively flat whereby opposite side edges of said material when bias cut lie in substantially a common plane and present substantially equal drag to said windup mechanisms, and a pivot intermediate the ends of and mounting said windup mechanism for angular adjustment relative to said mandrel.

9. In a bias-cutting machine for a tube of material, an elongated mandrel over which material passes under substantially constant tension, a cutting knife arranged angularly of said mandrel at one side thereof for bias cutting said tube of material, and a windup mechanism for pulling said tube over and along said mandrel, said mandrel being relatively flat whereby opposite side edges of said material when bias cut lie in substantially a common plane and including a stationary side bar, an adjustable side bar parallel to said stationary side bar, and cooperating therewith to define the mandrel proper, an extension operatively connected to said adjustable side bar and extending beyond one end of said stationary side bar, and a cantilever support outwardly of said mandrel proper extending transversely of said bars, said cantilever support being operatively connected to said extension and mounting said adjustable side bar for movement toward and away from said stationary side bar.

10. A bias-cutting machine including a mandrel over which a seamed tube of material is advanced, a cutting knife adjacent one end of said mandrel, a rotatable turn buckle having a cyclically operable drive adjacent the other end of said mandrel for delivering said tube of material to said mandrel, windup mechanisms adjacent said one end of said mandrel and extending angularly across said mandrel, said windup mechanisms being arranged to pull said tube over and along said mandrel and to remove biased material from said mandrel, a sensing device along the path of travel of the material through said machine and operable upon contact with successive seams in the material, and means under control of said sensing device and operatively connected to said drive to cycle said drive whereby said turn buckle is driven at an average rate dependent upon the speed of said windup mechanisms.

11. In a bias-cutting machine, a mandrel over which a seamed tube of goods is advanced for bias cutting, a cutter arranged angularly of said mandrel for bias cutting material, take-off mechanisms including a roller angularly disposed relative to said mandrel for spirally advancing said tube along said mandrel past said cutter and pulling the bias cut goods from said mandrel, periodically operable delivery means for rotationally presenting said tube to said mandrel, means at a point along the path of travel of the goods through the machine for sensing the occurrence of seams in the goods at said point, the means for sensing being disposed adjacent said roller and contacting the bias cut goods passing around said roller, means for orienting the sensing means relative to said roller in dependence upon the thickness of the bias cut goods, and means under control of said sensing means for controlling the presentation of goods to said mandrel in dependence upon the occurrence of seams at said point along the path of travel.

12. In a bias-cutting machine, an adjustable width mandrel including a stationary side bar, an adjustable side bar arranged substantially parallel to said stationary side bar and having an extension projecting beyond an end of said stationary side bar, said stationary and adjustable side bars defining the mandrel proper over which material in tubular form passes, a cantilever support arranged transverse of said mandrel outside the confines of said mandrel proper and operatively connected to said extension of said adjustable side bar, and a cutting knife arranged angularly of said mandrel adjacent said one end of said stationary side bar for severing a tube of material into bias cut goods during advance over said mandrel.

13. In a bias-cutting machine, a mandrel including a first side bar, a second side bar arranged in side by side relation relative to said first side bar and having an extension projecting beyond an end of said first side bar, a cantilever support arranged transverse of said mandrel and operatively connected to said extension of said second side bar, and a cutting knife arranged angularly of said mandrel adjacent said one end of said first side bar for severing a tube of material into bias cut goods during advance over said mandrel, said side bar being parallel in a region adjacent said cutting knife and being of a section in said region to tension said tube of material, said side bars being of a reduced section in advance of said first named region to present reduced drag to movement of said tube toward said first named region.

14. A bias cutting machine for material in seamed tubular form comprising an elongated mandrel, cutting means adjacent one end of said mandrel for severing the material in tubular form passing over said mandrel into bias-cut material, take-off mechanisms adjacent said one end of said mandrel for removing the bias-cut material from said mandrel at a constant take-off rate, means for rotationally presenting the material in seamed tubular form to the other end of said mandrel for pull over and along said mandrel by said take-off mechanisms, means at a point along the path of travel of the material through the machine for sensing the travel of seams past said point as a measure of the take-off rate, and means under control of the sensing means and operatively connected to the rotational presenting means for controlling the rotation of the presenting means in dependence upon sensing of seams in the material whereby the material is presented to said mandrel substantially at said constant take-off rate.

15. A bias cutting machine for material in seamed tubular form comprising an elongated flat mandrel having upper and lower faces, cutting means adjacent one end of said mandrel for severing the material in tubular form while passing over and around said mandrel into bias-cut material, take-off mechanisms adjacent said one end of said mandrel for angularly removing the bias-cut material from said mandrel at a constant take-off rate, means for rotationally presenting the material in seamed tubular form to the other end of said mandrel for pull along and about said mandrel by said take-off mechanisms at a predetermined take-off rate, means at a point along the path of travel of the material through the machine for sensing the travel of seams past said point as a measure of the take-off rate, and means under control of the sensing means and operatively connected to the presenting means for controlling the presentation of material in seamed tubular form to said mandrel in dependence upon travel of seams past said point.

16. A bias cutting machine for material in seamed tubular form comprising an elongated mandrel having horizontally-extending upper and lower faces, cutting means adjacent one end and one side of said mandrel for severing the material during passage along said upper face into bias-cut material, take-off mechanisms adjacent said one end of said mandrel and operative in the plane of said upper face for removing the bias-cut material from said mandrel at a constant take-off rate, means at a point along the path of travel of material through said machine for sensing the occurrence of succesive seams in said bias-cut material as a measure of the take-off rate and the travel of the material about the material about the mandrel, and means including a turn buckle for rotationally presenting the material in seamed tubular form to the other end of said mandrel for pull over, along and about said mandrel by said take-off mechanisms, the means for rotationally presenting the material in seamed tubular form including an electrical drive cycled by said sensing means whereby the material is presented to said mandrel substantially at said constant take-off rate.

17. In a bias cutting machine for a tube of material, an elongated flat mandrel having parallel upper and lower faces over which said tube passes under substantially constant tension, a cutting knife arranged angularly of said upper face of said mandrel and at one side thereof for bias cutting said tube, and windup mechanisms extending substantially across said mandrel at one end thereof, opposite side edges of said material when bias cut lying in substantially a common place coextensive with the upper face of said mandrel and presenting substantially equal drag to said windup mechanisms, said windup mechanisms including a pulling roller having its lowermost peripheral portion substantially in the plane of said upper face of said mandrel, a windup shaft, and means including a slip drive for driving said windup shaft to wind up the bias-cut material substantially at a uniform rate.

18. In a bias cutting machine, an adjustable width mandrel including a stationary side bar, an adjustable side bar arranged substantially parallel to said stationary side bar and having an extension projecting beyond an end of said stationary side bar, said adjustable side bar being movable to various positions of adjustment in substantial parallelism with said stationary side bar and cooperating therewith to define the mandrel proper, a cross bar for supporting said adjustable side bar arranged transverse of the mandrel proper, said cross bar being secured to the extension of said adjustable side bar outside of the confines of the mandrel proper, means slidably receiving and mounting said cross bar whereby said adjustable side bar is movable relative to said stationary side bar, and a cutting knife arranged angularly of said mandrel adjacent said one end of said stationary side bar for severing a tube of material into bias cut goods during advance over said mandrel.

19. In a bias cutting machine, an adjustable width mandrel including a stationary side bar and an adjustable side bar arranged substantially parallel to said stationary side bar, a supporting extension connected to said adjustable side bar and projecting beyond an end of said stationary side bar, said adjustable side bar being movable to various positions of adjustment in substantial parallelism with said stationary side bar, a cross bar arranged transverse of said mandrel at a location beyond said one end of said stationary side bar and connected to said extension for supporting said adjustable side bar, a mount slidably receiving said cross bar, and a cutting knife arranged angularly of said mandrel adjacent said one end of said stationary side bar for severing a tube of material into bias cut goods during advance over said mandrel, said supporting extension, cross bar and mount all being outside of the mandrel proper and in a region where said goods are bias cut.

20. In a bias cutting machine, a mandrel including a stationary side bar, an adjustable side bar arranged substantially parallel to said stationary side bar and having an extension projecting beyond an end of said stationary side bar, said adjustable side bar being movable to various positions of adjustment in substantial parallelism with said side bar and cooperating therewith to define the sides of a mandrel proper having horizontal upper and lower faces, a cross bar arranged transverse of said mandrel beyond said one end of said stationary side bar and connected to said adjustable side bar outside of the mandrel proper, means mounting said cross bar for movement transverse of said mandrel, a cutting knife arranged angularly of said mandrel adjacent said one end of said stationary side bar for severing a tube of material into bias cut goods during advance over said mandrel, pulling mechanisms for advancing a tube of material over said mandrel, said pulling mechanisms including a roller driven to exert a pulling force substantially in the plane of said upper face of said mandrel, and means biasing said adjustable side bar away from said stationary side bar, the biasing means providing a reacting force to said pulling force.

21. A bias cutting machine including a flat mandrel having upper and lower faces over which a seamed tube of material is advanced, a cutting knife adjacent one end of said mandrel and effective to sever material in the plane of said upper face, a rotatable turn buckle having a cyclically operable drive adjacent the other end of said mandrel for delivering said tube of material to said mandrel, windup mechanisms adjacent said one end of said mandrel and extending angularly across said mandrel, said windup mechanisms being arranged to pull said tube over and along said mandrel and to remove biased material from said mandrel at a uniform takeoff rate, and a sensing device along the path of travel of the material through the machine and including a movable actuator operable upon contact with successive seams in the material to cycle the drive for said turn buckle whereby the latter is driven at a rate substantially equal to said uniform takeoff rate.

22. A bias cutting machine including a flat mandrel having upper and lower faces over which a seamed tube of material is advanced, a cutting knife adjacent one end of said mandrel and effective to sever material in the plane of said upper face, a rotatable turn buckle having a cyclically operable drive adjacent the other end of said mandrel for delivering said tube of material to said mandrel, windup mechanisms adjacent said one end of said mandrel and extending angularly across said mandrel, said windup mechanisms being arranged to pull said tube over and along said mandrel and to remove biased material from said mandrel at a uniform takeoff rate, means including a central pivot mounting said windup mechanisms for angular adjustment relative to said mandrel, and a sensing device along the path of travel of the material through the machine and including a movable actuator operable upon contact with successive seams in the material to cycle the drive for said turn buckle whereby the latter is driven at a rate substantially equal to said uniform takeoff rate.

23. A bias cutting machine including a flat mandrel having upper and lower faces over which a seamed tube of material is advanced, a cutting knife adjacent one end and one side of said mandrel and effective in said upper face to sever said tube along a spiral path, a rotatable turn buckle having a cyclically-operable, electrically-controlled drive adjacent the other end of said mandrel for rotationally presenting a roll of the tubed material to said mandrel, windup mechanisms extending angularly of and across said mandrel, said windup mechanisms being arranged to pull said tubed material from said roll for advance over and along said mandrel and to remove biased material from said mandrel, a sensing device at a point along the path of travel of the material through the machine and including an actuator arranged to be contacted by the successive seams in the biased material and to cycle the drive for said turn buckle whereby the latter is driven at an average rate dependent upon the speed of said windup mechanisms.

24. A bias cutting machine including a flat mandrel having upper and lower faces over which a seamed tube of material is advanced, a cutting knife adjacent one end and one side of said mandrel and effective in said upper face to sever said tube along a spiral path, a rotatable turn buckle having a cyclically-operable, electrically-controlled drive adjacent the other end of said mandrel for rotationally presenting a roll of the tubed material to said mandrel, windup mechanisms extending angularly of and across said mandrel, said windup mechanisms being arranged to pull said tubed material from said roll for advance over and along said mandrel and to remove biased material from said mandrel, an actuator at a point along the path of travel of the material through the machine and movable in response to contact with successive seams in the biased material, and means responsive to movement of said actuator for cycling the drive for said turn buckle whereby the latter is turned at an average rate substantially synchronous with the spiral travel of the tube about said mandrel.

25. A bias cutting machine including a flat mandrel having upper and lower faces over which a seamed tube of material is advanced, a cutting knife adjacent one end of said mandrel and effective to sever material in the plane of said upper face, a rotatable turn buckle adjacent the other end of said mandrel for delivering said tube of material to said mandrel, a cyclically operable drive for said turn buckle including a motor and magnetic brake, windup mechanisms adjacent said one end of said mandrel and extending angularly across said mandrel, said windup mechanisms being arranged to pull said tube over and along said mandrel and to remove biased material from said mandrel at a uniform takeoff rate, sensing means at a point along the path of travel of the material through the machine and including a microswitch closed by contact with successive seams in the biased material to complete an energization circuit for said motor whereby said turn buckle is driven at a rate substantially equal to said uniform takeoff rate, and a commutator for interrupting said energization circuit after a cycle of said drive and for energizing said magnetic brake.

26. A bias cutting machine including a flat mandrel having upper and lower faces over which a seamed tube of material is advanced, a cutting knife adjacent one end of said mandrel and effective to sever material in the plane of said upper face, a rotatable turn buckle adjacent the other end of said mandrel for delivering said tube of material to said mandrel, a cyclically operable drive for said turn buckle including a motor and magnetic brake, windup mechanisms adjacent said one end of said mandrel arranged to pull said tube over and along said mandrel and to remove biased material from said mandrel at a uniform takeoff rate, sensing means at a point along the path of travel of the material through the machine and actuated by contact with successive seams in the biased material to complete an energization circuit for said motor whereby said turn buckle is rotated at a rate substantially equal to said uniform takeoff rate, and means for interrupting said energization circuit after a cycle of said drive and for energizing said magnetic brake.

27. In a machine for bias cutting material from a seamed tube, a mandrel, severing means along the path of travel of the material about said mandrel, windup mechanisms for pulling a tube of material over said mandrel, said mandrel including a stationary side bar and a movable bar for applying tension to said seamed tube, combined static and dynamic leading means acting on said movable bar, said combined static and dynamic loading means including a dead load operatively connected to said movable bar and resisting motion of said movable bar both toward and away from said stationary side bar and a live load operatively connected to said movable bar and urging said movable side bar away from said stationary side bar, said live load being greater than said dead load by an amount sufficient to provide said tension, the summation of said dead and live loads providing a reacting force to the pull exerted by said windup mechanisms.

28. In a machine for bias cutitng material from a seamed tube, a mandrel, windup mechanisms for pulling a tube of material over and about said mandrel, a cutter operatively disposed in relation to said mandrel for bias cutting material during passage over and about said mandrel, said mandrel including a bar movable radially inwardly and outwardly of the center of said mandrel for applying predetermined tension to said seamed tube, combined static and dynamic loading means acting on said movable bar, said combined static and dynamic loading means including a dead load operatively connected to said movable bar and resisting motion of said movable bar both inwardly and outwardly of said center line, and a live load operatively connected to said movable bar and urging said movable bar outwardly of said center line, said live load being greater than said dead load in an amount sufficient to provide said predetermined tension.

29. In a bias-cutting machine for a tube of material, an elongated mandrel over which material passes under substantially constant tension, a cutting knife arranged angularly of said mandrel at one side thereof for bias-cutting said tube of material, a windup mechanism including a roller extending substantially across and over said mandrel at one end thereof, said roller extending at an obtuse angle with respect to said one side of said mandrel, said windup mechanism pulling said tube over and along said mandrel and said mandrel being relatively flat whereby opposite side edges of said material when bias-cut lie in substantially a common plane and present substantially equal draw to said windup mechanisms, and a pivot intermediate the ends of and mounting said windup mechanism for angular adjustment relative to said mandrel.

30. In a bias-cutting machine for a tube of material, an elongated mandrel having a longitudinal center line and over which material passes under substantially constant tension, a cutting knife arranged angularly of said mandrel at one side therof for bias-cutting said tube of material, a windup mechanism including a roller extending substantially across and over said mandrel at one end thereof, said windup mechanism pulling said tube over and along said mandrel and said mandrel being relatively flat whereby opposite side edges of said material when bias-cut lie in substantially a common plane and present substantially equal drag to said windup mechanisms, and a pivot intermediate the ends of and mounting said windup mechanism for angular adjustment relative to said mandrel, the longitudinal center line of said mandrel intersecting the axis of said roller within the lateral limits of said windup mechanism which receive bias-cut material.

31. In a bias-cutting machine, an elongated relatively flat mandrel over which goods pass under substantially constant tension, said mandrel being of adjustable width and having a center line, a cutting knife arranged angularly of said madrel and at one side thereof for bias-cutting goods, and an adjustable windup mechanism including a roller extending substantially across said mandrel at one end thereof and making an obtuse angle with respect to said one side of said mandrel in various positions of angular adjustment, the center line of said mandrel in any position of adjustment intersecting said roller at a point within the lateral limits of said roller which receives bias-cut goods.

32. In a bias-cutting machine, an elongated relatively flat mandrel over which goods pass under substantially constant tension, said mandrel being of adjustable width and having a center line, a cutting knife arranged angularly of said madrel and at one side thereof for bias-cutting goods, and an adjustable windup mechanism including a roller extending substantially across said mandral at one end thereof and making an obtuse angle with respect to said one side of said mandrel in various positions of angular adjustment, the center line of said mandrel in any position of adjustment intersecting said roller at a point within the lateral limits of said roller which receives bias-cut goods, a windup shaft, and means including a slip clutch for driving said windup shaft.

33. In a bias-cutting machine, an elongated relatively flat mandrel over which goods pass under substantially constant tension, said mandrel being of adjustable width and having a center line, a cutting knife arranged angularly of said madrel and at one side thereof for bias cutting goods, a windup mechanism including a roller extending substantially across said mandrel at one end thereof, the center line of said mandrel in any position of adjustment intersecting said roller at a point within the lateral limits of said roller which receives bias-cut goods, and means including a pivot intermediate the ends of said windup mechanism mounting same for angular adjustment relative to said mandrel.

34. In a bias-cutting machine, an elongated relatively flat mandrel over which material passes under substantially constant tension, said mandrel being of adjustable width and having a center line, a cutting knife arranged angularly of said mandrel and at one side thereof for bias-cutting material, and an adjustable windup mechanism including a roller extending substantially across said mandrel at one end thereof and making an obtuse angle with respect to said one side of said mandrel in various positions of angular adjustment, said roller receiving bias-cut material about a portion of its periphery, opposite side edges of said bias-cut material when about said roller defining the lateral limits of said roller which are effective to receive said bias-cut material, the center line of said mandrel in any position of adjustment intersecting said roller at a point within said defined lateral limits of said roller.

35. In a bias-cutting machine, an elongated relatively flat mandrel over which material passes under substantially constant tension, said mandrel being of adjustable width and having a center line, a cutting knife arranged angularly of said mandrel and at one side thereof for bias-cutting material, and an adjustable windup mechanism including a roller extending substantially across said mandrel at one end thereof and making an obtuse angle with respect to said one side of said mandrel in various positions of angular adjustment, the center line of said mandrel in any position of adjustment intersecting said roller at a point within the lateral limits of said roller which receives bias-cut material, said windup mechanism further including a windup shaft, means operatively connected to and mounting said windup shaft for movement relative to said pulling roller, said windup shaft being adapted to receive the bias-cut material in a roll with said roll being in contact with said pulling roller, and means including a slip drive for driving said windup shaft to wind up the bias-cut material.

36. In a bias-cutting machine, an elongated relatively flat mandrel over which material passes under substantially constant tension, said mandrel being of adjustable width and having a center line, a cutting knife arranged angularly of said mandrel and at one side thereof for bias-cutting material, and an adjustable windup mechanism including a roller extending substantially across said mandrel at one end thereof and making an obtuse angle with respect to said one side of said mandrel in various positions of angular adjustment, the center line of said mandrel in any position of adjustment intersecting said roller at a point within the lateral limits of said roller which receives bias-cut material, said windup mechanism being arranged to take bias-cut material from said mandrel substantially in the plane of said relatively flat mandrel and further including a windup shaft, means operatively connected to and mounting said windup shaft for movement relative to said pulling roller, said windup shaft being adapted to receive the bias-cut material in a roll with said roll being in contact with said pulling roller, and means including a slip drive for driving said windup shaft to wind up the bias-cut material substantially at a uniform rate.

References Cited in the file of this patent

UNITED STATES PATENTS

| Number | Name | Date |
|---|---|---|
| 704,566 | Newell | July 15, 1902 |
| 1,259,834 | Cameron et al. | Mar. 19, 1918 |
| 1,432,207 | Prior et al. | Oct. 17, 1922 |
| 1,520,139 | Prior et al. | Dec. 23, 1924 |
| 1,787,208 | Morris | Dec. 30, 1930 |
| 1,896,596 | Seddon | Feb. 7, 1933 |
| 1,955,282 | Gardner et al. | Apr. 17, 1934 |
| 1,984,717 | Williams | Dec. 18, 1934 |
| 2,110,856 | Gardner et al. | Mar. 15, 1938 |
| 2,394,859 | Judelshon | Feb. 12, 1946 |
| 2,596,208 | Carter | May 13, 1952 |